(12) United States Patent
Siebenmorgen et al.

(10) Patent No.: US 11,550,135 B2
(45) Date of Patent: Jan. 10, 2023

(54) OPTICAL ARRANGEMENT AND METHOD FOR LIGHT BEAM SHAPING FOR A LIGHT MICROSCOPE

(71) Applicant: Carl Zeiss Microscopy GmbH, Jena (DE)

(72) Inventors: Jörg Siebenmorgen, Jena (DE); Ingo Kleppe, Jena (DE); Ralf Netz, Jena (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 61 days.

(21) Appl. No.: 17/046,565

(22) PCT Filed: Apr. 11, 2019

(86) PCT No.: PCT/EP2019/059200
§ 371 (c)(1),
(2) Date: Oct. 9, 2020

(87) PCT Pub. No.: WO2019/206651
PCT Pub. Date: Oct. 31, 2019

(65) Prior Publication Data
US 2021/0132354 A1   May 6, 2021

(30) Foreign Application Priority Data

Apr. 26, 2018   (DE) .................... 10 2018 110 117.1

(51) Int. Cl.
G02B 27/28    (2006.01)
G02F 1/01     (2006.01)
G02B 21/06    (2006.01)

(52) U.S. Cl.
CPC .......... *G02B 21/06* (2013.01); *G02B 27/283* (2013.01); *G02B 27/286* (2013.01);
(Continued)

(58) Field of Classification Search
None
See application file for complete search history.

(56) References Cited

U.S. PATENT DOCUMENTS 5,181,054 A    1/1993  Nioolas et al.
5,833,338 A    11/1998  Barak
(Continued)

FOREIGN PATENT DOCUMENTS

CN    1214127 A    4/1999
CN    105122116 A    12/2015
(Continued)

OTHER PUBLICATIONS

German Search Report for Priority DE 10 2018 110 117.1 dated Dec. 14, 2018.
Translation of Written Opinion of the International Searching Authority for PCT/EP2019/059200 dated Nov. 22, 2019.
(Continued)

*Primary Examiner* — Ashok Patel
(74) *Attorney, Agent, or Firm* — Duane Morris LLP; Arthur M. Dresner

(57) ABSTRACT

An optical arrangement for light beam shaping in a light microscope has a first and a second liquid crystal region, each of which has a plurality of independently switchable liquid crystal elements with which a phase of incident light is changeable in a settable manner. A first polarization beam splitter is arranged in such a way that incident light is split in a polarization-dependent manner into reflection light, which is reflected in the direction of the first liquid crystal region, and transmission light, which is transmitted in the direction of the second liquid crystal region. The first or a second polarization beam splitter is arranged such that the reflection light and transmission light are combined onto a common beam path after phase modulation by means of the liquid crystal regions.

8 Claims, 4 Drawing Sheets

(52) U.S. Cl.
CPC ........ *G02F 1/0136* (2013.01); *G02F 2203/02* (2013.01); *G02F 2203/50* (2013.01)

(56) References Cited

U.S. PATENT DOCUMENTS

| | | | |
|---|---|---|---|
| 2004/0070835 A1 | 4/2004 | Seyfried | |
| 2007/0247691 A1* | 10/2007 | Obrebski | G02B 21/0012 359/227 |
| 2016/0054576 A1 | 2/2016 | Inoue et al. | |

FOREIGN PATENT DOCUMENTS

| | | | |
|---|---|---|---|
| CN | 106501958 A | | 3/2017 |
| CN | 106 501 958 B | | 1/2018 |
| DE | 102 47 247 A1 | | 4/2004 |
| DE | 10 2009 036 566 A1 | | 2/2011 |
| DE | 102009036566 A1 | | 2/2011 |
| DE | 11 2014 001 820 T5 | | 12/2015 |
| EP | 1158336 | * | 11/2001 |
| JP | 2014 066868 A | | 4/2014 |
| JP | 2014066868 A | | 4/2014 |
| WO | 9714076 A1 | | 4/1997 |
| WO | 2005 122876 A1 | | 12/2005 |

OTHER PUBLICATIONS

Jesacher, Alexander, et al.; Near-perfect hologram reconstruction with a spatial light modulator; Optics Express 2008; 16(4):2597-2603.

Jesacher, Alexander; "Applications of Spatial Light Modulators for Optical Trapping and Image Processing"; Thesis for Doctorate May 31, 2007; 1-134.

Van Putten, E.G., et al.; "Spatial amplitude and phase modulation using commercial twisted nemadic LCDs"; Applied Optics 2008; 47(12):2076-2081.

Kenny, F., et al.; "Adaptive optimisation of a generalised phase contrast beam shaping system"; Optics Communications 2015; 3(42):109-114.

Davis, Jeffrey A., et al.; "Encoding amplitude information onto phase-only filters"; Applied Optics 1999; 38(23):5004-5013.

Zhu, Long, et al.; "Arbitrary Manipulation of Spatial Amplitude and Phase Using Phase-Only Spatial Light Modulators"; Scientific Reports 2014; 4:7441; 1-7.

Meadowlark Optics: Spatial Light Modulators—XY Series Datasheet (Jul. 30, 2014) p. 1-12.

Saito Mitsunori, et al.. Tunable retarder made of pentaprisms and liquid crystal, Liquid Crystals XV, SPIE, 1000 20th Street, Bellingham WA 98225, vol. 8114, No. 1, Sep. 8, 2011, p. 1-12.

* cited by examiner

OPTICAL ARRANGEMENT AND METHOD FOR LIGHT BEAM SHAPING FOR A LIGHT MICROSCOPE

RELATED APPLICATIONS

The present application is a U.S. National Stage application of International PCT Application No. PCT/EP2019/059200 filed on Apr. 11, 2019 which claims priority benefit of German Application No. DE 10 2018 110 117.1 filed on Apr. 26, 2018, the contents of each are incorporated by reference in their entirety.

FIELD OF THE INVENTION

The present invention relates in a first aspect to an optical arrangement for light beam shaping. In a second aspect, the invention relates to a method for light beam shaping.

BACKGROUND OF THE INVENTION

In a light microscope, light beam shaping may be desired in the excitation and/or detection beam path. For example, aberrations and other imaging errors can be corrected in the detection beam path by way of light beam shaping. Spatial light modulators (SLMs), which comprise a liquid crystal matrix, offer a particularly high degree of flexibility.

Such a generic optical arrangement for light beam shaping in a light microscope comprises a first liquid crystal region, which has a plurality of liquid crystal elements which are switchable independently of one another and with which a phase of incident light is changeable in a settable manner. Analogously, a method for light beam shaping in a light microscope comprises phase modulating light by means of a first liquid crystal region that has a plurality of liquid crystal elements which are switchable independently of one another.

In this way, the light phase can be changed variably over the cross section of the light beam. This allows the wavefront of the light beam to be shaped variably. This is particularly advantageous for an aberration correction or for a variable depth examination using extended depth of field (EDoF) methods.

However, problems result from the fact that a liquid crystal matrix can only phase-modulate light of a specific polarization direction. By contrast, light of a polarization direction perpendicular thereto does not experience any changeable phase change due to the liquid crystal matrix. Unpolarized light is therefore usually first linearly polarized, wherein 50% of the light intensity is lost. Especially in the case of fluorescent light, a 50% reduction in the amount of detectable light constitutes a considerable drawback.

DESCRIPTION OF EMBODIMENTS OF THE INVENTION

It can be regarded an object of the invention to provide an optical arrangement and a method for light beam shaping which allow light beam shaping particularly flexibly in an efficient manner.

This object is achieved by the optical arrangement, and by the method, having the features as set forth in the annexed claims. Advantageous variants of the optical arrangement according to the invention and of the method according to the invention are subjects of the dependent claims and will additionally be explained in the description that follows.

In the case of the optical arrangement of the type mentioned above, a second liquid crystal region is provided according to the invention. Said second liquid crystal region comprises a plurality of liquid crystal elements which are switchable independently of one another and by means of which a phase of incident light is changeable in a settable manner. A first polarization beam splitter is provided and arranged in such a way that incident light is split in a polarization-dependent manner into reflection light, which is reflected in the direction of the first liquid crystal region, and transmission light, which is transmitted in the direction of the second liquid crystal region. The first or an additional, second polarization beam splitter is now arranged such that it combines the reflection and transmission light onto a common beam path after they have been phase-modulated by the liquid crystal regions.

In a corresponding manner, the following steps are provided according to the invention in the method of the type mentioned above:

separating light in a polarization-dependent manner by means of a first polarization beam splitter into reflection light, which is reflected in the direction of the first liquid crystal region, and transmission light, which is transmitted in the direction of a second liquid crystal region, and phase-modulating the transmission light by means of the second liquid crystal region, and combining the reflection light and transmission light, which have been phase-modulated by the two liquid crystal regions, onto a common beam path by means of the first or a second polarization beam splitter.

By splitting light in a polarization-dependent manner and directing it onto the two different liquid crystal regions, it is also possible to phase-modulate unpolarized light without major light losses occurring.

The two liquid crystal regions can belong to two different liquid crystal matrices. The two liquid crystal matrices are aligned in such a way that one liquid crystal matrix can effect a phase modulation of the transmission light and the other liquid crystal matrix can effect a phase modulation of the reflection light. For this purpose, the two liquid crystal matrices can be rotated relative to one another, in particular through 90°, so that a variable phase change is possible for both polarization components that are obtained by splitting at the polarization beam splitter. Alternatively, it is also possible that the liquid crystal matrices/liquid crystal regions are not rotated relative to one another, but that the polarization direction of the transmission or reflection light is rotated by a polarization rotator before being incident on the liquid crystal matrix, with the result that, despite the same alignment of both liquid crystal regions, both the transmission light and the reflection light can be phase-modulated. A further polarization rotation can take place downstream of the two liquid crystal regions by the same or a further polarization rotator, with the result that the transmission light and the reflection light are polarized perpendicularly to one another again and can be combined again by the/a polarization beam splitter.

A design with only one polarization beam splitter both for splitting into reflection and transmission light and for combining the reflection and transmission light is realized in the case of variants of the invention in which the first polarization beam splitter comprises a polarization beam splitter cube. Said polarization beam splitter cube splits light that is incident from a first direction into transmission and reflection light, which leave the polarization beam splitter cube in a second and a third direction. The transmission and reflection light coming from the two liquid crystal regions is combined in a fourth direction by the polarization beam splitter cube.

Together with optional beam deflection elements (for example mirrors or prisms), a beam path from the polarization beam splitter via both liquid crystal regions and back to the polarization beam splitter can form a closed loop, through which the transmission light and reflection light travel in opposite directions. Here, the transmission light and reflection light thus travel along the same beam path. The two liquid crystal regions are preferably aligned such that one of the two liquid crystal regions phase-modulates only the transmission light and the other of the two liquid crystal regions phase-modulates only the reflection light. When it is incident on the polarization beam splitter again, the transmission light is transmitted again and the reflection light is reflected again, as a result of which the two are combined.

Alternatively, the same polarization beam splitter can also be used for splitting and combining the transmission and reflection light without the transmission and reflection light traveling along the same beam path in opposite directions.

In this case in particular, amplitude modulation can be effected by the two liquid crystal regions. A liquid crystal region alone can initially bring about a phase shift and thereby a polarization rotation or a polarization change. Depending on the polarization change, a ratio between reflection and transmission at the polarization beam splitter, which combines the transmission and reflection light, can be variably set. The amplitude/intensity of the light component that is used further is modulated thereby. In this variant, no closed loop is formed as a beam path starting from the polarization beam splitter. Rather, the reflection and transmission light is directed onto different liquid crystal regions, preferably of the same liquid crystal matrix, and then directed back to the polarization beam splitter along the respectively same path. The reflection light and transmission light can each be directed perpendicularly onto the liquid crystal regions. In order for the polarization beam splitter to combine them onto a common beam path, the structured transmission light must be reflected at the polarization beam splitter and the structured reflection light must be transmitted. This can be achieved by bringing about a polarization change through the liquid crystal regions. The transmission and reflection light each pass through a polarization rotator between the polarization beam splitter and the liquid crystal region. The polarization rotator can be traversed twice, specifically both on the way to the liquid crystal region and on the way back from it. Owing to the liquid crystal regions and the polarization rotator, the polarization direction can be rotated through 90° on the way back to the polarization beam splitter. The same polarization rotator or different polarization rotators can be used for the transmission and reflection light. The polarization rotator can be a $\lambda/2$ plate whose optical axis can be at an angle of 22.5° relative to the transmission or reflection light and correspondingly at an angle of 67.5° relative to the other one of the transmission or reflection light. Alignment of the liquid crystal matrix is at an angle of 45° relative to the original polarization direction of both the transmission light and the reflection light and at an angle of 22.5° relative to the optical axis of the $\lambda/2$ plate. As a result, the liquid crystal matrix can rotate the polarization direction of the incident light, in particular through 90°, or change it to circular/elliptical polarization. When it passes through the $\lambda/2$ plate again, the polarization direction of the transmission light and the reflection light is rotated through 90° with respect to the initial polarization or is circularly/elliptically polarized. In this way, the proportions of the reflection and transmission light to which they are reflected and transmitted in each case at the combining polarization beam splitter can be set.

A liquid crystal matrix is a relatively expensive component. Relevant cost savings can therefore be achieved if the two liquid crystal regions are different regions of the same liquid crystal matrix. This is particularly useful since a liquid crystal matrix is often not square, but has more columns than rows, which is why part of the liquid crystal matrix would remain unused anyway if only the reflection light or only the transmission light fell on this liquid crystal matrix.

In order that the same liquid crystal matrix can be used for the phase modulation of reflection and transmission light, at least one polarization rotator, for example a half-wave plate, can be present. The polarization rotator can be arranged in such a way that a polarization of the transmission and/or reflection light is rotated in such a way that the transmission and reflection light are phase-modulated by exactly one of the two liquid crystal regions.

In embodiments in which the transmission light and the reflection light travel along the same beam path in opposite directions, the transmission light and the reflection light are directed onto both liquid crystal regions successively. The at least one polarization rotator can be arranged in such a way that the transmission light is polarization-rotated in particular through 90° before and after it is incident on one of the two liquid crystal regions so that it is phase-modulated by only one liquid crystal region. Likewise, the reflection light is polarization-rotated by the polarization rotator in particular through 90° before and after it is incident on one of the two liquid crystal regions so that it is phase-modulated by only one of the liquid crystal regions (this being the liquid crystal region that does not phase-modulate the transmission light).

For better beam quality, it may be preferred if the transmission light and the reflection light remain uninfluenced when they are first incident on one of the liquid crystal regions and are phase-modulated only when they are subsequently incident on the respective other of the liquid crystal regions. The liquid crystal regions and the polarization directions of the transmission and reflection light can be aligned accordingly.

A variant is described below in which, in addition to phase modulation, the amplitude of the light over the beam cross section can also be variably influenced. For this purpose, the first liquid crystal region is formed by a first liquid crystal matrix and the second liquid crystal region is formed by a second liquid crystal matrix that differs from the former. The reflection light is split on the way to the first liquid crystal region by means of a reflection light beam splitter into two reflection light components of different polarizations. The two reflection light components are directed onto different portions of the first liquid crystal matrix, wherein one of the two reflection light components is polarization-rotated through 90° before and after it is incident on the first liquid crystal matrix, so that both reflection light components can be phase-modulated. It is also possible for both reflection light components to be polarization-rotated, whereby they are preferably rotated to the same polarization direction, so that both can be phase-modulated by the same liquid crystal matrix. Then the two reflection light components are combined again, preferably with the reflection light beam splitter, and directed back to the polarization beam splitter. Depending on the difference between the phase modulations of the two reflection light components that is selected, this results in a settable rotation of the polarization of the combined reflection light or in a change to a circular or elliptical polarization. If the reflection light is now incident on the polarization beam splitter again, it is either transmitted or reflected or partially transmitted and reflected, depending on the polarization rotation/polarization change. A reflected component is directed in the direction of origin by the polarization beam splitter and is no longer used by the light microscope. The transmitted portion, by contrast, is used further, whereby an amplitude modulation can be provided in addition to a phase modulation: The phase difference between the reflection light components can be used to set which intensity component of the reflection light is to be transmitted.

In an analogous manner, the transmission light is split on the way to the second liquid crystal region into two transmission light components of different polarizations by means of a transmission light beam splitter. The two transmission light components are directed onto different portions of the second liquid crystal matrix. One of the two transmission light components is polarization-rotated in particular through 90° before and after it is incident on the second liquid crystal matrix. The two transmission light components are then combined again, wherein a polarization rotation of the combined transmission light occurs depending on the phase modulation. As a result, the transmission light is reflected or transmitted depending on the polarization rotation when it is incident on the polarization beam splitter again.

If possible, the two reflection light components should travel the same optical path length before they are combined again. For this purpose, a transparent retardation element can be present in the beam path of one of the reflection light components. Likewise, a transparent retardation element can be present in the beam path of one of the transmission light components and can be designed such that both transmission light components travel the same optical path length.

The reflection light beam splitter and the first liquid crystal region can be arranged such that both reflection light components are incident perpendicularly on the respective portion of the first liquid crystal region and travel back to the reflection light beam splitter along the same path. Normal incidence can be advantageous for the beam quality. The same can be provided for the transmission light.

In order that the phase difference between the two reflection light components allows amplitude modulation over a particularly large range, the two reflection light components should have the same intensity/power, if possible. This can be achieved by appropriate orientation of the reflection light beam splitter relative to the polarization beam splitter. Alternatively, a polarization rotator can be arranged between the polarization beam splitter and the reflection light beam splitter and be oriented in such a way that the polarization of the reflection light is rotated to an alignment by way of which the reflection light is divided equally at the reflection light beam splitter. More generally, an equal intensity can also be understood to mean an intensity difference of at most 20% or at most 10%.

The liquid crystal regions can be arranged in a pupil plane or an intermediate image plane. In the case of an arrangement in a pupil plane, a phase grating structure imprinted here leads to the light in the sample plane having an amplitude grating structure. In order to provide a desired amplitude grating structure, that is to say a desired grating-shaped intensity distribution in the sample plane, a suitable phase pattern for the pupil plane can be calculated using an IFTA (iterative Fourier transform algorithm). A control unit can be set up to ascertain, via an IFTA, a phase grating structure for a specified desired amplitude grating structure, to which phase grating structure the control unit then sets the liquid crystal matrix.

The invention also relates to a light microscope having an optical arrangement, as is described here. The optical arrangement can be arranged in an illumination beam path, that is to say between a light source and a sample region. Alternatively, the optical arrangement can be arranged in a detection beam path, that is to say between a sample region and a light detector. In the detection beam path, the advantages that are of particular importance are that the two liquid crystal regions allow light beam shaping with only minimum light losses.

BRIEF DESCRIPTION OF THE DRAWINGS

The properties of the invention described as additional optical arrangement features also yield variants of the method according to the invention when used as intended. Conversely, the variants of the invention described are achieved by a corresponding arrangement of the components of the optical arrangement. Further advantages and features of the invention will be described below with reference to the appended schematic figures.

DETAILED DESCRIPTION OF THE DRAWINGS

Similar and similarly acting constituent parts are generally identified by the same reference signs in the figures.

Figure 1:
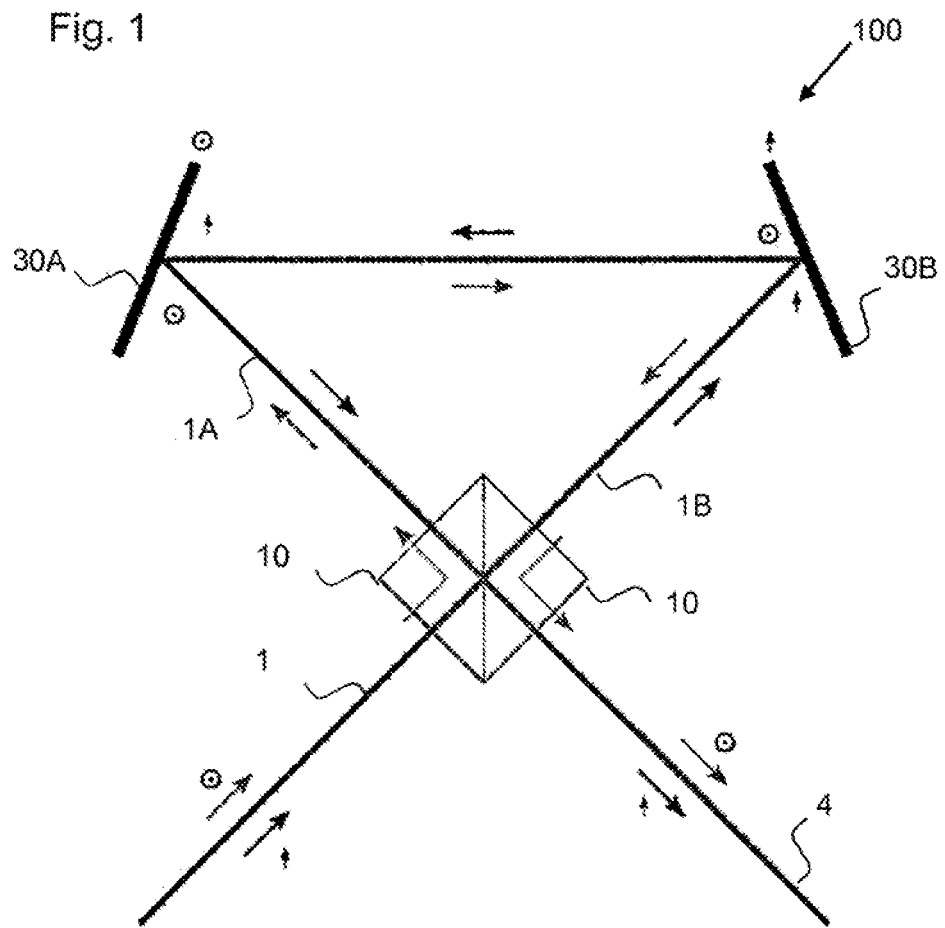
FIG. 1 schematically shows a first exemplary embodiment of an optical arrangement according to the invention.

FIG. 1 shows a first exemplary embodiment of an optical arrangement 100 according to the invention. The optical arrangement 100 can be arranged in an illumination or detection beam path of a light microscope and serves for light-beam shaping of incident light 1. As indicated in FIG. 1, the light 1 can be unpolarized, that is to say it can comprise a polarization component in the drawing plane and a polarization component perpendicular to the drawing plane.

The optical arrangement 100 comprises a polarization beam splitter 10, by means of which the light 1 is split into two different light components that are polarized perpendicularly to each other. The polarization beam splitter 10 is designed as a polarization beam splitter cube, which reflects one light component (hereinafter reflection light 1A) and transmits the other light component (hereinafter transmission light 1B). The reflection light 1A is directed onto a first liquid crystal region 30A, further onto a second liquid crystal region 30B, and back to the polarization beam splitter 10. The reflection light 1A is here directed onto the polarization beam splitter 10 in a direction in which the transmission light 1B emerges from the polarization beam splitter 10. The reflection light 1A is reflected again when it is incident on the polarization beam splitter 10 again.

The transmission light 1B travels along the same beam path as the reflection light 1A, but in the opposite direction: first to the second liquid crystal region 30B, on to the first liquid crystal region 30A, and then to the polarization beam splitter 10, where it is transmitted due to its polarization direction. Here, it is superposed with the reflection light, which again produces unpolarized light 4.

The transmission light and reflection light is phase-modulated by the two liquid crystal regions 30A, 30B. As a result, the emerging unpolarized light 4 is also phase-modulated as desired. In this embodiment, the two liquid crystal regions 30A, 30B are formed by two separate liquid crystal matrices, but alternatively they can also be portions of the same liquid crystal matrix.

Each liquid crystal region 30A, 30B comprises a plurality of liquid crystal elements that retard incident light. The light passes through the liquid crystal elements, is reflected at the rear of the liquid crystal region 30A, 30B, and passes through the liquid crystal elements again before it emerges. Alternatively, transmissive liquid crystal regions are also possible. The phase of the light is changed owing to the passage through the liquid crystal elements. Depending on the switching state of a liquid crystal element, the phase change can be set variably. Not only is an on-/off-state of a liquid crystal element possible, intermediate stages can also be set, which means that a gradual or continuous phase change is made possible. Due to the plurality of liquid crystal elements, different phase changes can be set over the beam cross section. This allows a wavefront of the light to be set as desired.

However, a liquid crystal element allows a variable phase change only for a specific light polarization. In contrast, light with a light polarization that is perpendicular thereto cannot generally be variably phase-shifted, that is to say, a switching state of the liquid crystal element has no effect on the phase change.

The two liquid crystal regions 30A, 30B from FIG. 1 are rotated through 90° with respect to one another. As a result, due to its polarization, the transmission light 1B is influenced by only one of the two liquid crystal regions 30A, 30B. The reflection light 1A is polarized perpendicular to the transmission light 1B and is therefore influenced by the other of the two liquid crystal regions 30A, 30B. It may be preferred that the liquid crystal regions 30A, 30B are aligned such that the reflection light 1A is not phase-modulated when it is first incident on the liquid crystal region 30A, but only when it is subsequently incident on the liquid crystal region 30B, and likewise that the transmission light 1B is not phase-modulate already when it is first incident on the liquid crystal region 30B, but only when it is subsequently incident on the liquid crystal region 30A. This can be conducive for the beam quality.

With the structure of FIG. 1, pixel-by-pixel phase modulation of a light beam can be carried out with a very small number of components, without any appreciable intensity components of the light beam 1 being lost.

Figure 2:
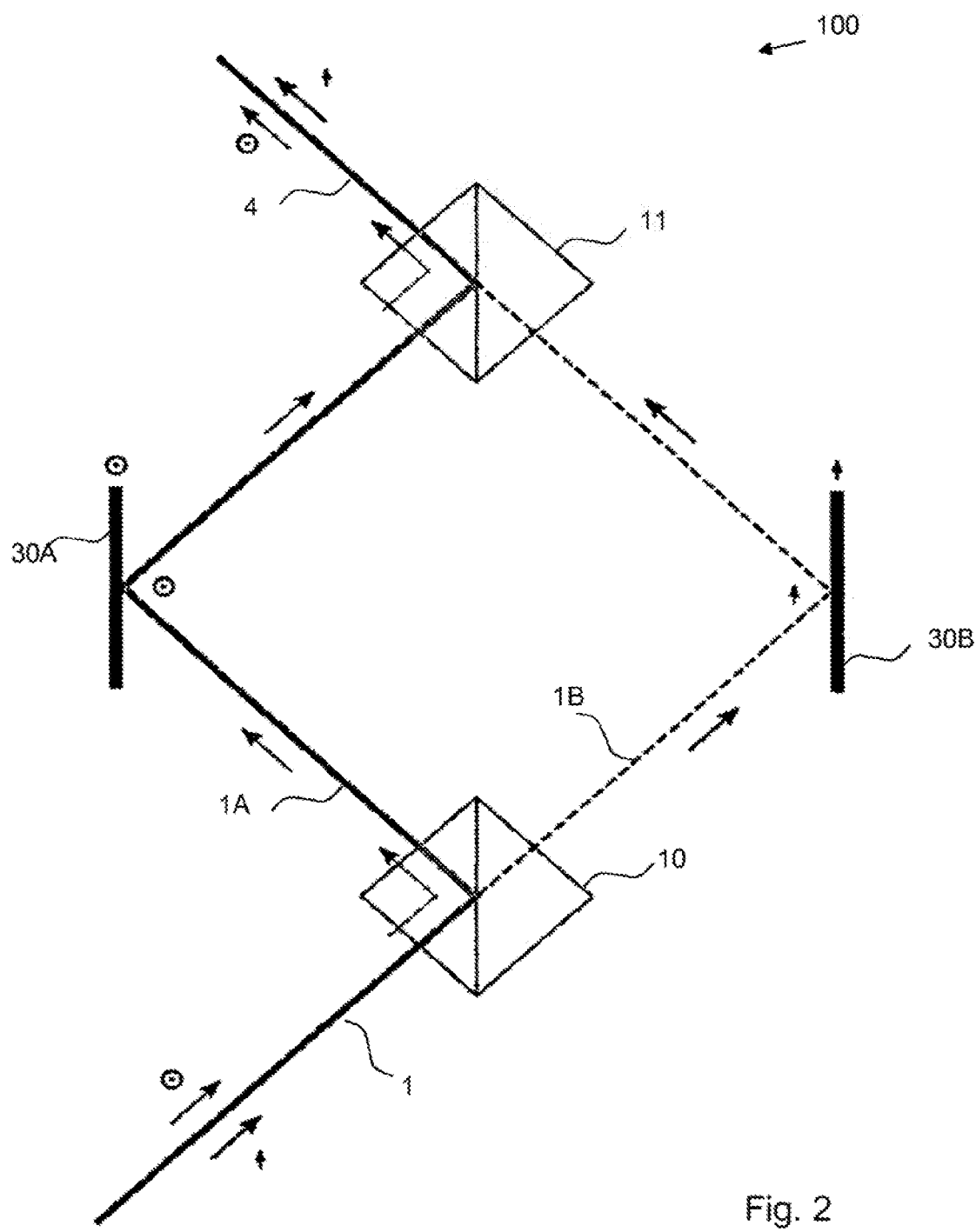
FIG. 2 schematically shows a second exemplary embodiment of an optical arrangement according to the invention.

Another exemplary embodiment of an optical arrangement 100 according to the invention is shown in FIG. 2. As in FIG. 1, light 1 that is incident through a polarization beam splitter 10 is divided here into reflection light 1A and transmission light 1B. In this case, however, the reflection light 1A is incident only on the liquid crystal region 30A, while the reflection light 1B is incident only on the liquid crystal region 30B. Next, the reflection light 1A and transmission light 1B are combined by a second polarization beam splitter 11. In this embodiment, the reflection light 1A and transmission light 1B are incident only on the liquid crystal region 30A or 30B by way of which they are actually phase-modulated. This can be advantageous for the beam quality.

Figure 3:
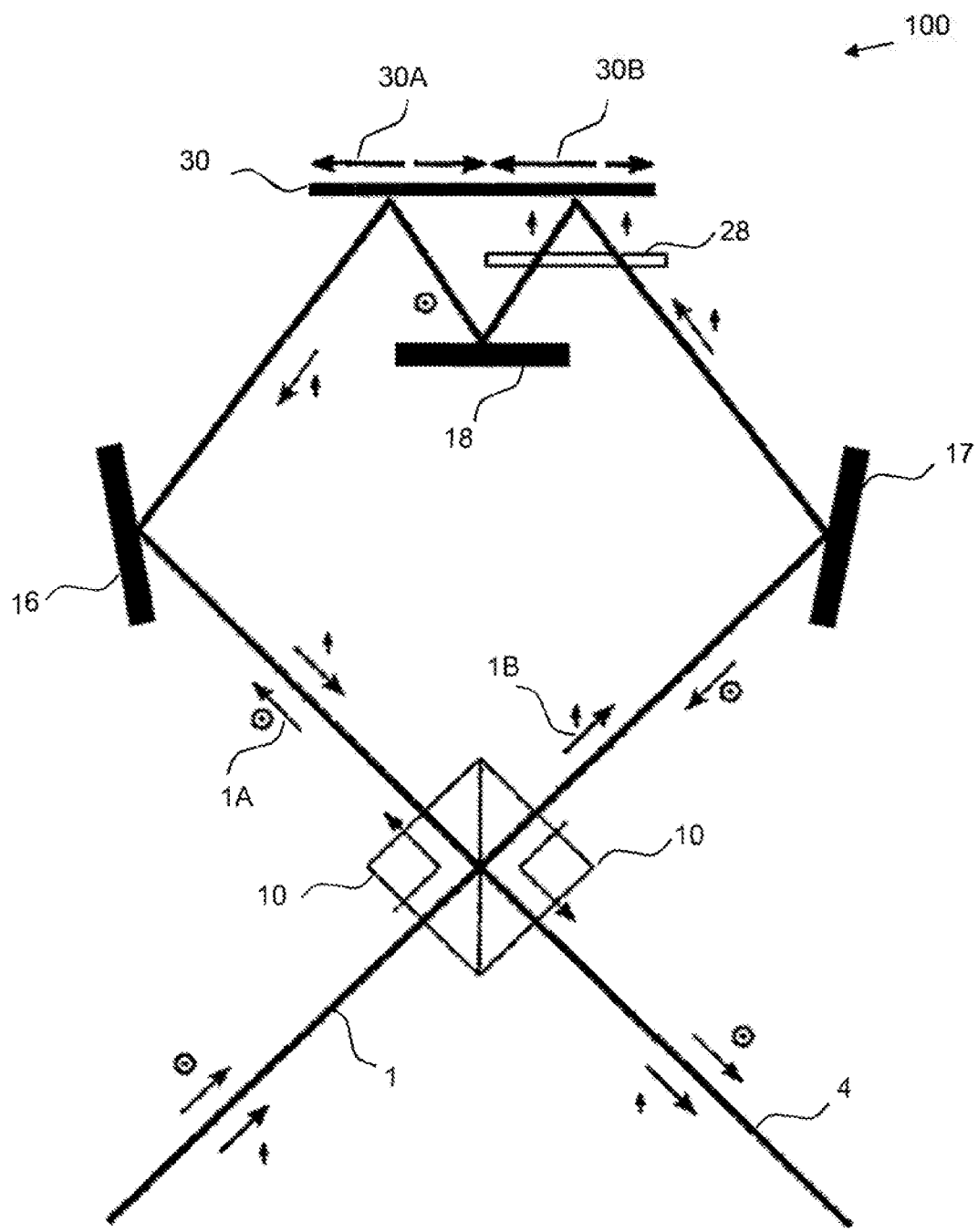
FIG. 3 schematically shows a third exemplary embodiment of an optical arrangement according to the invention.

A particularly cost-efficient embodiment is provided in FIG. 3, where the two liquid crystal regions 30A and 30B are different regions of the same liquid crystal matrix 30. In this case, the two liquid crystal regions 30A and 30B can variably phase-modulate only light of the same polarization direction. However, in order that both the transmission light 1B and the reflection light 1A can be phase-modulated, a suitable polarization rotation must take place. This is achieved by means of a polarization rotator 28, for example a retardation plate/half-wave plate. The reflection light 1A is incident first on the first liquid crystal region 30A and is then rotated through 90° in the polarization direction by the polarization rotator 28 before it is incident on the second liquid crystal region 30B. As a result, the reflection light 1A is phase-modulated only by the first or the second liquid crystal region 30A, 30B. The reflection light 1A then travels through the same polarization rotator 28 again (alternatively, an additional polarization rotator can also be used), and, as a result, the reflection light 1A has its original polarization direction again. As a result, it is reflected at the polarization beam splitter 10 rather than transmitted, for example. The transmission light 1B passes through the same beam path as the reflection light 1A, but in reverse order. As a result, the transmission light 1B is likewise phase-modulated merely by one of the two liquid crystal regions 30A, 30B. It may be preferred that the transmission light 1B is phase-modulated only by the liquid crystal region 30A and the reflection light 1A is phase-modulated only by the liquid crystal region 30B.

In order to direct the reflection light 1A and the transmission light 1B from the polarization beam splitter 10 twice onto the liquid crystal matrix 30 and twice through the polarization rotator 28, deflection elements 16, 17, 18 can be provided. In the example shown, three mirrors are provided as deflection elements 16, 17, 18, but a different number and arrangement of deflection elements is also possible.

Figure 4:
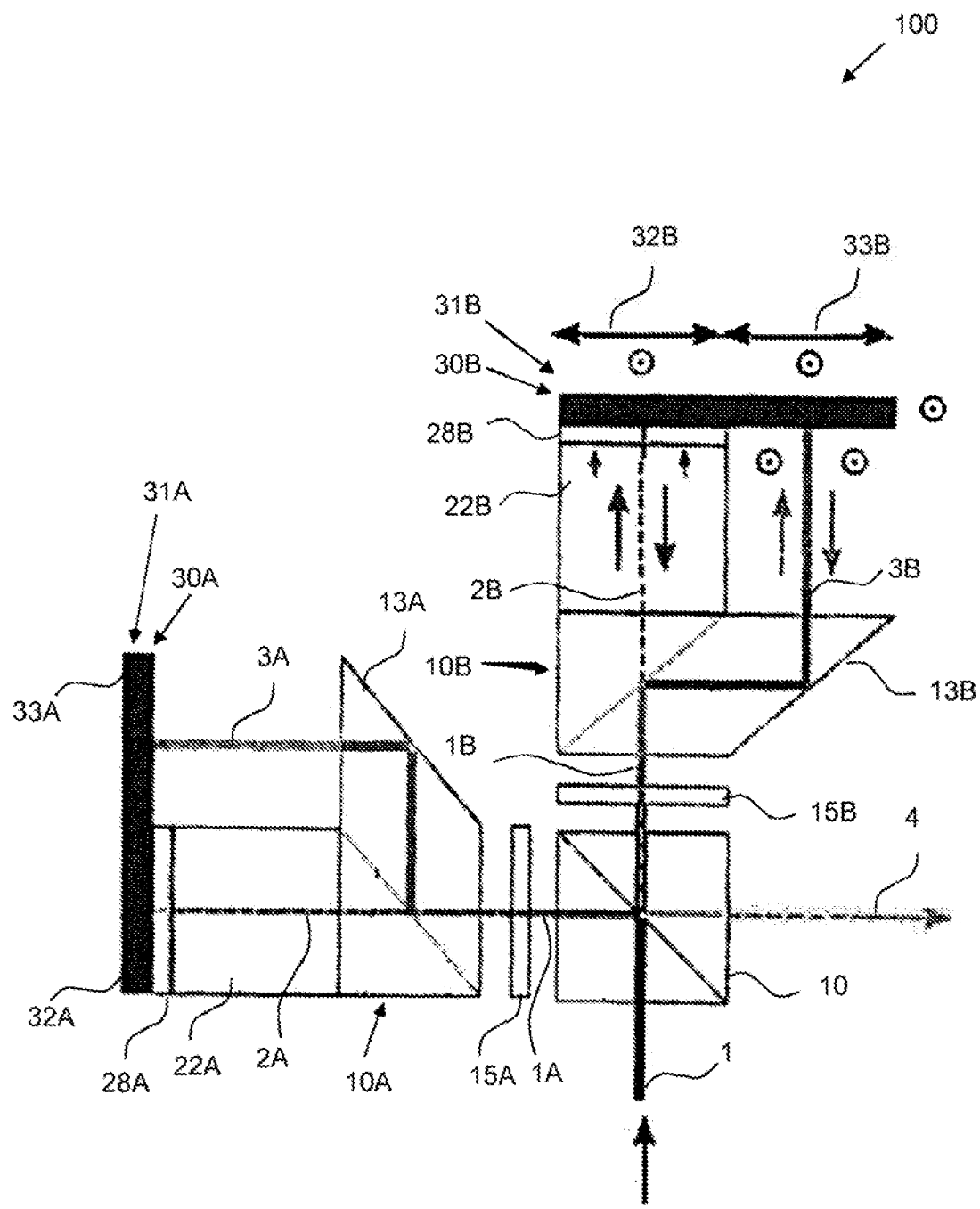
FIG. 4 schematically shows a fourth exemplary embodiment of an optical arrangement according to the invention.

The embodiments in FIGS. 1 to 3 allow phase modulation over a beam cross section. An embodiment which also allows amplitude modulation over the beam cross section is shown schematically in FIG. 4.

The optical arrangement 100 here likewise comprises a polarization beam splitter 10 that splits light 1 into reflection light 1A and transmission light 1B. The reflection light 1A is in turn phase-modulated by a first liquid crystal region 30A and then directed back to the polarization beam splitter 10. Analogously, the transmission light 1B is directed to a second liquid crystal region 30B, phase-modulated thereby, and then directed back to the polarization beam splitter 10. Here, too, the polarization beam splitter 10 can combine the phase-modulated reflection and transmission light into an emerging light beam 4. The first liquid crystal region 30A is here formed by a first liquid crystal matrix 31A, while the second liquid crystal region 30B is here formed by a second liquid crystal matrix 31B.

In contrast to the previous embodiments, a further polarization beam splitter (hereinafter reflection light beam splitter 10A), which splits the reflection light 1A into two reflection light components 2A and 3A that are polarized perpendicular to each other, is present in the beam path of the reflection light 1A. Said two reflection light components 2A and 3A are directed onto different portions 32A, 33A of the first liquid crystal region 30A and are phase-modulated there in each case. The two reflection light components 2A and 3A that are polarized perpendicular to each other should have a suitable polarization direction to be phase-modulated by the portions 32A, 33A of the same liquid crystal matrix 31A. A polarization rotator 28A is required herefor. In the example shown, the polarization rotator 28A is located in the beam path of the reflection light component 2A transmitted at the reflection light beam splitter 10A. Depending on the orientation of the liquid crystal matrix 31A, the polarization rotator 28A can also be arranged in the beam path of the reflection light component 3A reflected at the reflection light beam splitter 10A (not shown). The two phase-modulated reflection light components 2A and 3A are again incident on the reflection light beam splitter 10A and are combined there, in the direction of the polarization beam splitter 10.

If the two reflection light components 2A and 3A are phase-modulated differently, the reflection light that was combined again by the reflection light beam splitter 10A can be rotated in its polarization direction; in addition, the linearly polarized reflection light may have become elliptically polarized light. This change in polarization decides the proportions at which the reflection light returning to the polarization beam splitter 10 is transmitted or reflected. Thus, an intensity/amplitude of the transmitted portion can be set by means of the liquid crystal matrix 31A. As an advantage, both the phase and the amplitude of the reflection light can be variably set over its cross section. The phase and the amplitude can be set here independently of each other.

In order for the reflection light 1A to be incident on the reflection light beam splitter 10A with a suitable polarization direction to be reflected and transmitted there in equal parts, a reflection light polarization rotator 15A (for example a λ/2 plate) can be arranged between the polarization beam splitter 10 and the reflection light beam splitter 10A. The reflection light beam splitter 10A can, as shown, deflect/reflect the reflected reflection light component 3A at its outside 13A, so that the two reflection light components 2A and 3A travel parallel to one another. As a modification of the illustrated case, the transmitted reflection light component 2A could also be deflected such that the two reflection light components 2A and 3A travel in parallel. In this way, the two reflection light components 2A and 3A can be incident perpendicularly on the liquid crystal matrix 31A. In order that both reflection light components 2A and 3A travel the same optical path length, a transparent retardation element 22A can be present in the beam path of one of the reflection light components 2A and 3A.

For the transmission light 1B, the components described for the reflection light 1A can be duplicated and perform the analogous function. Thus, a transmission light polarization rotator 15B can rotate a polarization direction of the transmission light 1B such that it is divided into two transmission light components 2B, 3B of the same intensities at the following transmission light beam splitter 10B. The transmission light component 2B passes through a transparent retardation element 22B and a polarization rotator 28B to then be incident on a portion 32B of the second liquid crystal region 30B. Here, the transmission light component 2B is phase-modulated and travels back along the same path. The other transmission light component 3B is reflected at an outer side 13B of the transmission light beam splitter 10B and is incident on another portion 33B of the same liquid crystal region 30B, which is formed by a single liquid crystal matrix 31B. The two phase-modulated transmission light components 2B and 3B are combined by the transmission light beam splitter 10B, wherein, in addition to a phase modulation itself, a change in polarization can also be brought about due to the phase modulation. The transmission light 1B is transmitted and/or reflected at the polarization beam splitter 10, depending on the change in polarization.

The light 1 can in particular be sample light to be detected, for example fluorescent light. In particular, aberrations can be corrected by the phase modulation. The light is then passed on as the light beam 4 in the direction of a detector.

The invention permits such phase modulation in a cost-effective manner and with very low light losses.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

LIST OF REFERENCE SIGNS

1 Light
1A Reflection light
1B Transmission light
2A, 3A Reflection light components
2B, 3B Transmission light components
4 Emerging light beam
10 Polarization beam splitter
10A Reflection light beam splitter
10B Transmission light beam splitter
11 Second polarization beam splitter
13A, 13B Reflective outer side
15A Reflection light polarization rotator
15B Transmission light polarization rotator
16-18 Deflection elements
22A, 22B Retardation element
28, 28A, 28B Polarization rotator
30, 31A, 31B Liquid crystal matrix
30A First liquid crystal region
30B Second liquid crystal region
31A First liquid crystal matrix
31B Second liquid crystal matrix
33A, 33B First portion of the liquid crystal region 30A and 30B, respectively
32A, 32B Second portion of the liquid crystal region 30A and 30B, respectively
100 Optical arrangement

What is claimed is:

1. An optical arrangement for light beam shaping in a light microscope, comprising
a first liquid crystal region having a plurality of liquid crystal elements which are switchable independently of one another and by means of which a phase of incident light is changeable in a settable manner;
a second liquid crystal region;
a first polarization beam splitter arranged to split incident light in a polarization-dependent manner into reflection light, which is reflected in the direction of the first liquid crystal region, and transmission light, which is transmitted in the direction of the second liquid crystal region;
wherein said first polarization beam splitter is arranged to combine reflection light and transmission light, which have been phase-modulated by the liquid crystal regions, onto a common beam path;
wherein
the first and second liquid crystal regions are different regions of the same liquid crystal matrix; and
at least one polarization rotator arranged to rotate a polarization of at least one of the transmission light and the reflection light in such a way that each of the transmission light and the reflection light is phase-modulated by exactly one of the two liquid crystal regions.

2. The optical arrangement as claimed in claim 1, wherein the first and second liquid crystal regions and the polarization beam splitter are arranged such that reflection light passes from the polarization beam splitter via both liquid crystal regions to the polarization beam splitter and transmission light travels along the same path in the opposite direction;

wherein the two liquid crystal regions are aligned such that one of the two liquid crystal regions phase-modulates only the transmission light and the other of the two liquid crystal regions phase-modulates only the reflection light.

3. The optical arrangement as claimed in claim 1, wherein the first and second liquid crystal regions and the polarization directions of the transmission light and of the reflection light are aligned such that both the transmission light and the reflection light each remain uninfluenced when they are first incident on the first or second liquid crystal region and are influenced when they are incident on the liquid crystal regions for the second time.

4. A light microscope having an optical arrangement as claimed in claim 1, wherein the optical arrangement is arranged in an illumination or detection beam path of the light microscope.

5. An optical arrangement for light beam shaping in a light microscope, comprising
a first liquid crystal region having a plurality of liquid crystal elements which are switchable independently of one another and by means of which a phase of incident light is changeable in a settable manner;
a second liquid crystal region;
a first polarization beam splitter arranged to split incident light in a polarization-dependent manner into reflection light, which is reflected in the direction of the first liquid crystal region, and transmission light, which is transmitted in the direction of the second liquid crystal region;
wherein said first polarization beam splitter is arranged to combine reflection light and transmission light, which have been phase-modulated by the liquid crystal regions, onto a common beam path;

wherein
the transmission light and the reflection light travel along the same beam path in opposite directions, wherein the transmission light and the reflection light are directed successively onto both the first and second liquid crystal regions; and
the at least one polarization rotator is arranged in such a way
that the transmission light is polarization-rotated through 90° before and after being incident on one of the first and second liquid crystal regions so that it is phase-modulated only by the other of the first and second liquid crystal regions, and
that the reflection light is polarization-rotated through 90° before and after being incident on one of the first and second liquid crystal regions so that it is phase-modulated only by the one of the first and second liquid crystal regions.

6. The optical arrangement as claimed in claim 5, wherein the first and second liquid crystal regions and the polarization beam splitter are arranged such that reflection light passes from the polarization beam splitter via both liquid crystal regions to the polarization beam splitter and transmission light travels along the same path in the opposite direction;

wherein the two liquid crystal regions are aligned such that one of the two liquid crystal regions phase-modulates only the transmission light and the other of the two liquid crystal regions phase-modulates only the reflection light.

7. The optical arrangement as claimed in claim 5, wherein the first and second liquid crystal regions and the polarization directions of the transmission light and of the reflection light are aligned such that both the transmission light and the reflection light each remain uninfluenced when they are first incident on the first or second liquid crystal region and are influenced when they are incident on the liquid crystal regions for the second time.

8. A light microscope having an optical arrangement as claimed in claim 5, wherein the optical arrangement is arranged in an illumination or detection beam path of the light microscope.

* * * * *